(12) United States Patent
Tokunaga et al.

(10) Patent No.: US 12,122,472 B2
(45) Date of Patent: Oct. 22, 2024

(54) FUEL TANK

(71) Applicant: SUZUKI MOTOR CORPORATION, Hamamatsu (JP)

(72) Inventors: Katsuhiko Tokunaga, Hamamatsu (JP); Naoyuki Sezaki, Hamamatsu (JP); Yoshie Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 332 days.

(21) Appl. No.: 17/561,243

(22) Filed: Dec. 23, 2021

(65) Prior Publication Data

US 2022/0212739 A1 Jul. 7, 2022

(30) Foreign Application Priority Data

Jan. 4, 2021 (JP) ................................ 2021-000164

(51) Int. Cl.
 *B62J 35/00* (2006.01)
 *B01D 19/00* (2006.01)
(52) U.S. Cl.
 CPC .......... *B62J 35/00* (2013.01); *B01D 19/0068* (2013.01)
(58) Field of Classification Search
 CPC ........................... B62J 35/00; B01D 19/0068
 USPC ...... 95/155; 220/374, DIG. 33, 203.02, 202, 220/747, 367.1; 138/89, 96 R
 See application file for complete search history.

(56) References Cited

U.S. PATENT DOCUMENTS

| 2003/0094456 | A1* | 5/2003 | Matsubara | ........... B60K 15/035 220/374 |
| 2017/0334285 | A1 | 11/2017 | Tanaka | |
| 2017/0334286 | A1 | 11/2017 | Tanaka | |

FOREIGN PATENT DOCUMENTS

| CN | 108032942 A | * | 5/2018 | .............. B62J 35/00 |
| JP | S 59-026380 A | | 2/1984 | |
| JP | H 05-305889 A | | 11/1993 | |
| JP | H 09-024874 A | | 1/1997 | |
| JP | 2013-043529 A | | 3/2013 | |
| JP | 2015-071316 A | | 4/2015 | |

OTHER PUBLICATIONS

Extended European Search Report mailed May 31, 2022, issued to European Application No. 21217289.4.
Japanese Office Action dated Jun. 4, 2024, issued by the Japanese Patent Office in corresponding application JP 2021-000164.

* cited by examiner

*Primary Examiner* — Robert A Hopkins
*Assistant Examiner* — Qianping He
(74) *Attorney, Agent, or Firm* — Stein IP LLC

(57) ABSTRACT

A fuel tank includes a tank panel in which a storage space of a fuel is formed, a tank inlet fixed to the tank panel, and a tank cap that allows the tank inlet to be opened and closed. The tank inlet includes a bottomed cylindrical inlet plate to which the tank cap is attached, an inlet pipe that protrudes from a bottom wall of the inlet plate into the storage space, and a separator configured to separate the fuel entering from the storage space into a liquid component and a gas component. The separator is supported by the bottom wall of the inlet plate in the storage space, and the separator is disposed on an outer side of the inlet pipe and on an inner side relative to an outer edge of the inlet plate in a bottom view of the tank inlet.

7 Claims, 9 Drawing Sheets

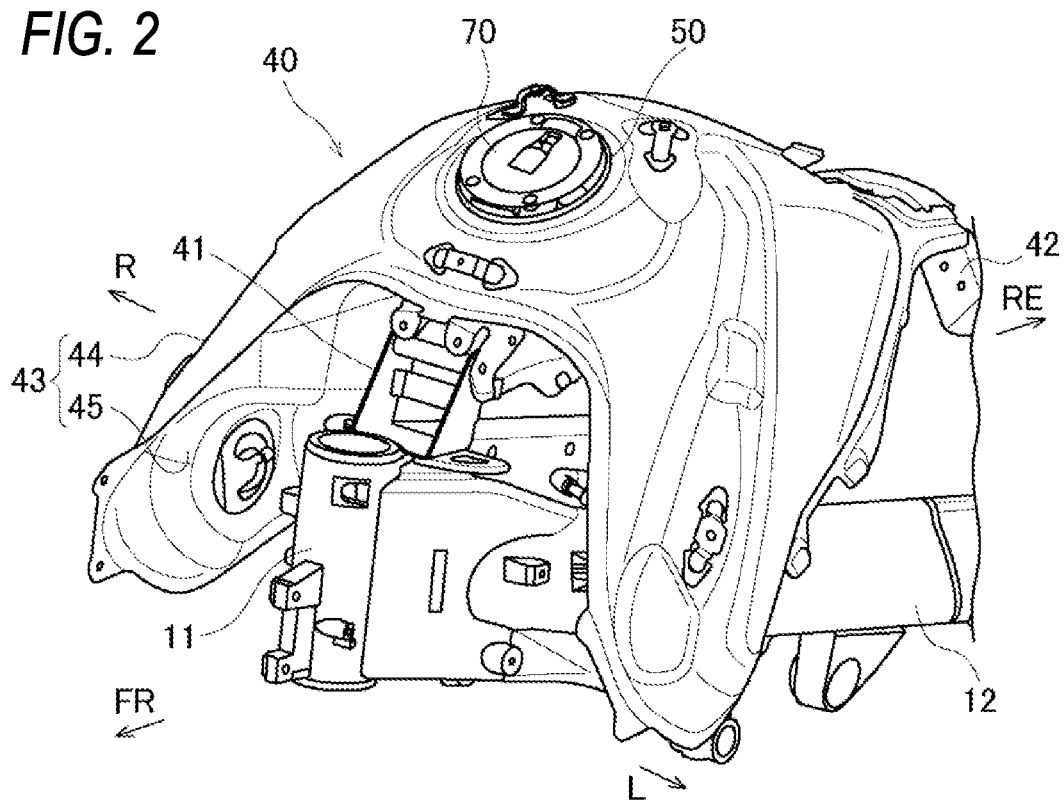

FUEL TANK

CROSS-REFERENCE TO RELATED APPLICATIONS

The disclosure of Japanese Patent Application No. 2021-000164 filed on Jan. 4, 2021, including specification, drawings and claims is incorporated herein by reference in its entirety.

BACKGROUND

The present invention relates to a fuel tank.

As a tank cap of a fuel tank, a tank cap has been known that implements unlocking and locking by using a mechanical key (see, for example, Patent Literature 1). The tank cap disclosed in Patent Literature 1 is provided with a lock mechanism that implements locking by inserting a lock bar into a lock cover. When the mechanical key is inserted into a key hole of the lock mechanism and is rotated, the lock bar is removed from the lock cover, thereby implementing unlocking. In recent years, there has been a demand for high functionality for a tank cap of a fuel tank, and there has been a demand for unlocking and locking of the tank cap by a smart key using wireless communication.

Patent Literature 1: JP-A-H9-024874

SUMMARY

According to one advantageous aspect of the present invention, there is provided a fuel tank according to an aspect of the present invention including a tank panel in which a storage space of a fuel is formed, a tank inlet that is fixed to the tank panel, and a tank cap that allows the tank inlet to be opened and closed. The tank inlet includes an inlet plate which has a bottomed cylindrical shape and to which the tank cap is attached, an inlet pipe that protrudes from a bottom wall of the inlet plate into the storage space, and a separator configured to separate the fuel entering from the storage space into a liquid component and a gas component. The separator is supported by the bottom wall of the inlet plate in the storage space, and the separator is disposed on an outer side of the inlet pipe and on an inner side relative to an outer edge of the inlet plate in a bottom view of the tank inlet.

BRIEF DESCRIPTION OF DRAWINGS

FIG. 2 is a perspective view of a fuel tank of the present embodiment.

DETAILED DESCRIPTION OF EXEMPLIFIED EMBODIMENTS

A tank cap of a mechanical key specification is provided with a separator that separates a fuel from a fuel tank into gas and liquid. Similarly, a tank cap of a smart key specification is also provided with a separator, but since an electric component is added to the tank cap, a cap size thereof is larger than that of the tank cap of the mechanical key specification. In addition, with respect to the tank cap of the smart key specification, a basic structure of a fuel tank employing the tank cap of the mechanical key specification cannot be diverted, and manufacturing cost increases. Such a problem may occur not only due to a difference in specification between the mechanical key and the smart key but also due to a change in a cap structure.

The present invention has been made in view of the above, and an object thereof is to provide a fuel tank capable of suppressing an increase in a cap size and diverting an existing basic structure.

A fuel tank according to an aspect of the present invention includes a tank panel in which a storage space of a fuel is defined. A tank inlet is fixed to the tank panel, and the tank inlet is opened and closed by a tank cap. The tank cap is attached to a bottomed cylindrical inlet plate of the tank inlet, and an inlet pipe protrudes from a bottom wall of the inlet plate into the storage space. A separator is supported by the bottom wall of the inlet plate in the storage space of the tank panel, and a fuel entering from the storage space to the tank cap side is separated into a liquid component and a gas component by the separator. Since the separator is provided outside the tank cap, a cap size of the tank cap is not increased by the separator. The separator is disposed on an outer side of the inlet pipe and on an inner side relative to an outer edge of the inlet plate in a bottom view of the inlet plate, that is, on an inner side of a projection plane of the inlet plate in a bottom view. The separator does not protrude from the inlet plate, and a change in a basic structure of the fuel tank due to presence or absence of the separator does not occur. Accordingly, manufacturing cost can be reduced by diverting existing manufacturing equipment or the like.

Figure 1:
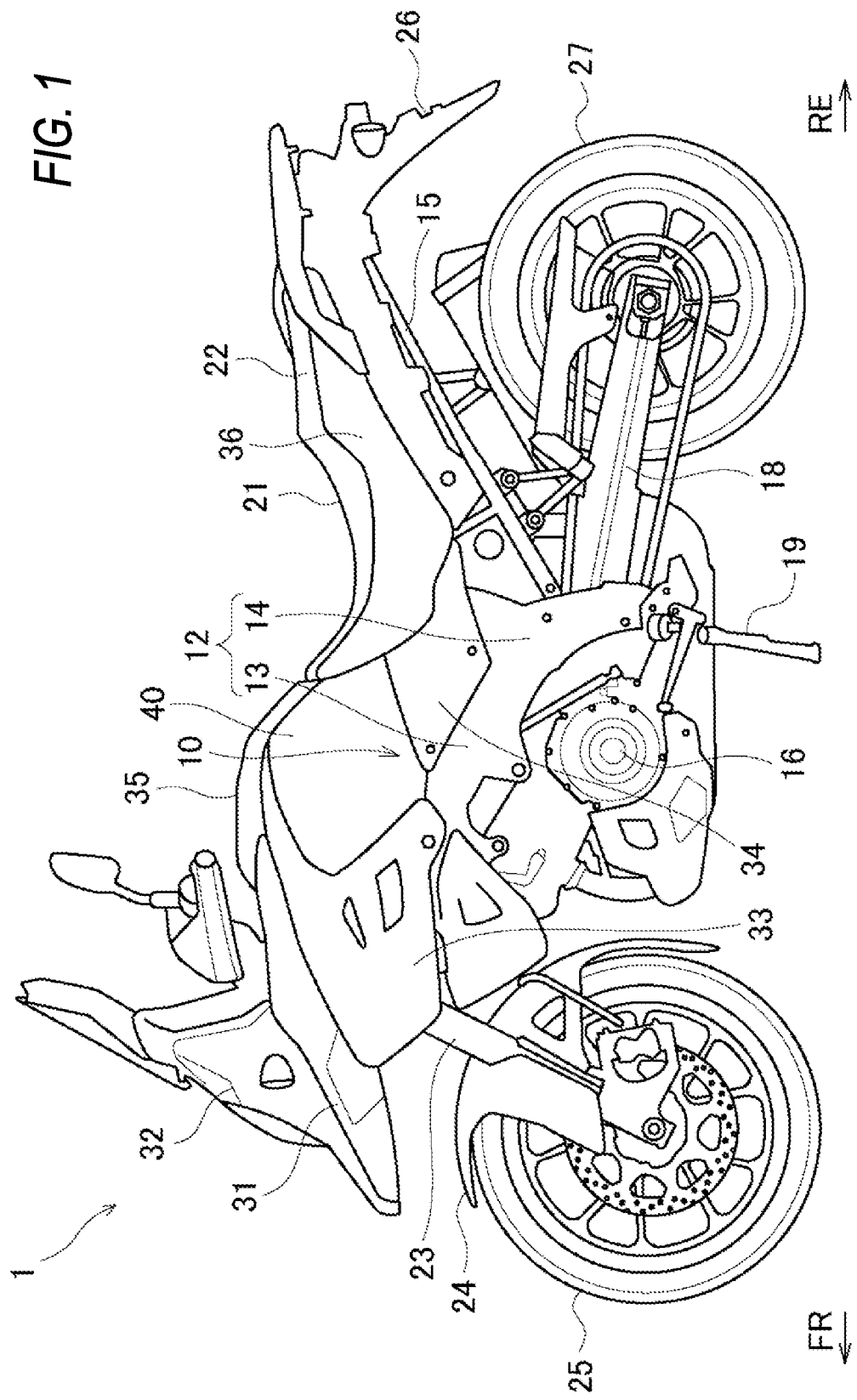
FIG. 1 is a left side view of a straddle-type vehicle according to an embodiment.

Hereinafter, an embodiment will be described in detail with reference to the accompanying drawings. FIG. 1 is a left side view of a straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As illustrated in FIG. 1, a straddle-type vehicle 1 includes various types of components such as an engine 16 and an electrical system that are mounted on a twin spar-type vehicle body frame 10 formed by aluminum casting. The vehicle body frame 10 includes a pair of main frames 12 branching from a head pipe 11 (see FIG. 2) to the left and right and extending toward the rear side, and a pair of down frames (not shown) branching from the head pipe 11 to the left and right and extending toward a lower side. A rear portion of the engine 16 is supported by the pair of main frames 12, and a front portion of the engine 16 is supported by the pair of down frames. By supporting the engine 16 with the vehicle body frame 10, rigidity of the entire vehicle is secured.

Front-side portions of the main frames 12 serve as tank rails 13 positioned above the engine 16, and a fuel tank 40 is supported by the tank rails 13. Rear-side portions of the main frames 12 serve as body frames 14 positioned behind the engine 16, and swing arms 18 are swingably supported at substantially middle positions of the body frames 14 in an up-down direction. Seat rails (not shown) and a back stay 15 extend toward the rear side from upper portions of the body frames 14. A rider seat 21 and a pillion seat 22 are supported on the seat rails on a rear side of the fuel tank 40.

A pair of front forks 23 are supported on the head pipe 11 via a steering shaft (not shown) so as to be steered. A front wheel 25 is rotatably supported by lower portions of the front forks 23, and an upper portion of the front wheel 25 is covered with a front fender 24. The swing arms 18 extend toward the rear side from the body frames 14. A rear wheel 27 is rotatably supported at rear ends of the swing arms 18, and an upper side of the rear wheel 27 is covered with a rear fender 26. The engine 16 is coupled to the rear wheel 27 via a chain drive type transmission mechanism, and power from the engine 16 is transmitted to the rear wheel 27 via the transmission mechanism.

Various covers are attached to the vehicle body frame 10 of the straddle-type vehicle 1 as a vehicle body exterior. For example, a front portion of the vehicle is covered with a body cowl 31 and a center body cowl 32. In a vehicle side portion, a front side of the fuel tank 40 is covered with a pair of side covers 33, and a rear side of the fuel tank 40 is covered with a pair of frame covers 34. A vehicle upper portion is covered with a tank cover 35, the rider seat 21, and the pillion seat 22. A lower side of the rider seat 21 and the pillion seat 22 is covered with a pair of rear covers 36. A side stand 19 is provided on a left side surface of the straddle-type vehicle 1 that allows a vehicle body to self-stand in an inclined manner.

In the fuel tank 40 of the straddle-type vehicle 1, it is desired to adopt a tank cap of a smart key specification in addition to a tank cap of a mechanical key specification. In the tank cap of the mechanical key specification, a mechanical key is inserted into a key hole of the tank cap, and a lock bar is moved by rotation of the mechanical key, so that the tank cap is mechanically locked and unlocked. On the other hand, in the tank cap of the smart key specification, a smart key and a controller communicate with each other, and a lock bar is moved by the controller via an actuator, so that the tank cap is electrically locked and unlocked.

Each of the tank cap of the mechanical key specification and the tank cap of the smart key specification is provided with a separator that separates a fuel entering from an inside of the tank to the tank cap side into gas and liquid. In the tank cap of the smart key specification, it is necessary to incorporate an electric component such as a solenoid, and when a separator having the same volume as that of the tank cap of the mechanical key specification is provided in the tank cap of the smart key specification, the cap size increases. In addition, there is a problem that basic structures of the fuel tank differ due to a difference in shapes of the tank cap of the mechanical key specification and the tank cap of the smart key specification.

For this reason, for the same machine, it is necessary to prepare mold jigs and manufacturing equipment of the tank panel separately in order to manufacture the fuel tanks of the mechanical key specification and the smart key specification, and manufacturing cost of the fuel tank increases. Therefore, in the fuel tank 40 of the present embodiment, a separator in a tank cap 70 is minimized, and an external separator 61 is attached to a tank inlet 50 to suppress an increase in cap size (see FIG. 3B). In addition, by devising an arrangement position of the separator 61, the basic structure of the fuel tank is made common to the tank caps of the mechanical key specification and the smart key specification.

Figure 3A:
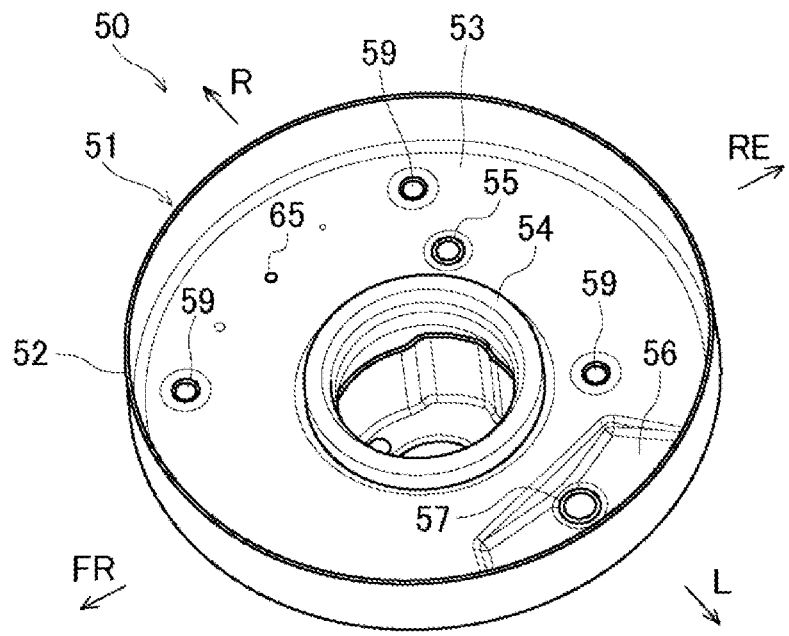
FIG. 3A is a perspective view of a tank inlet according to the present embodiment.
Figure 3B:
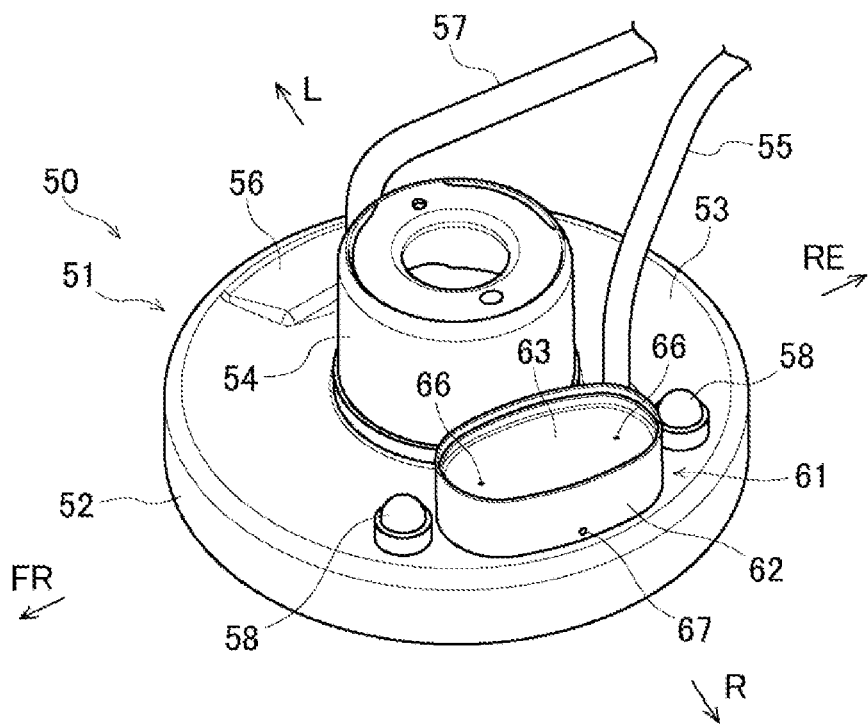
FIG. 3B is another perspective view of the tank inlet according to the present embodiment.
Figure 4A:
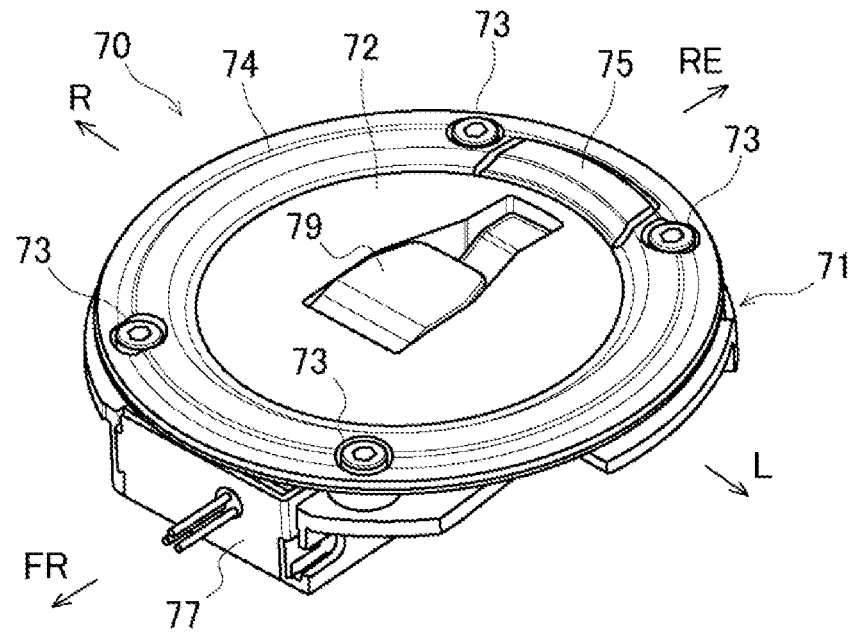
FIG. 4A is a perspective view of a tank cap of the present embodiment.
Figure 4B:
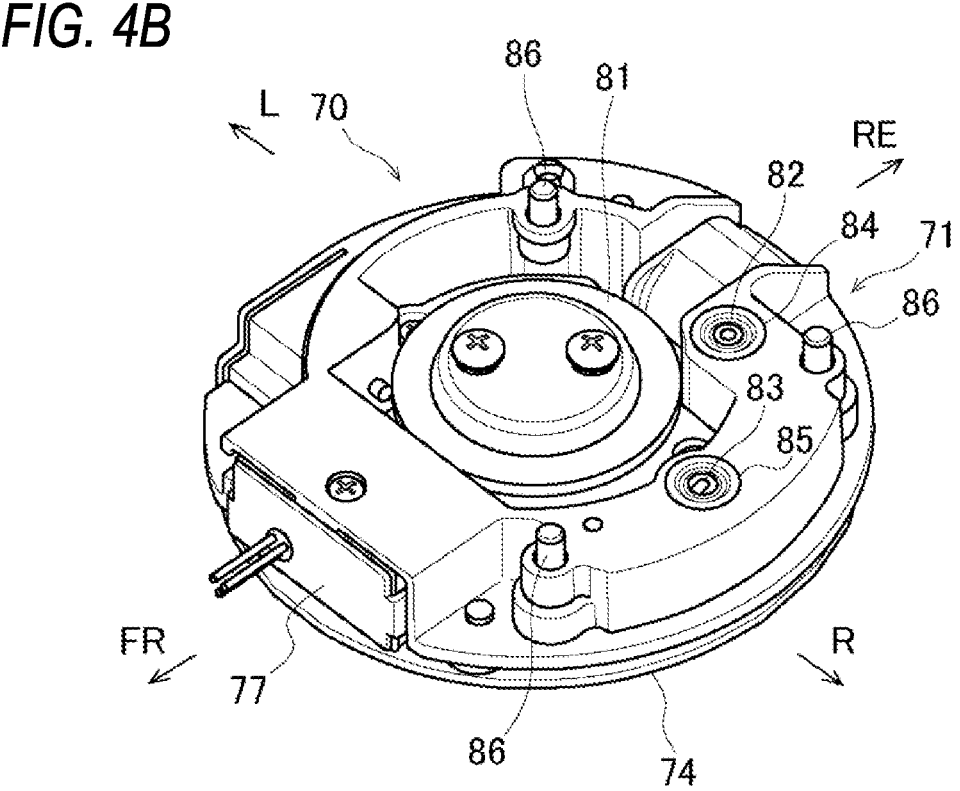
FIG. 4B is another perspective view of the tank cap of the present embodiment.
Figure 5:
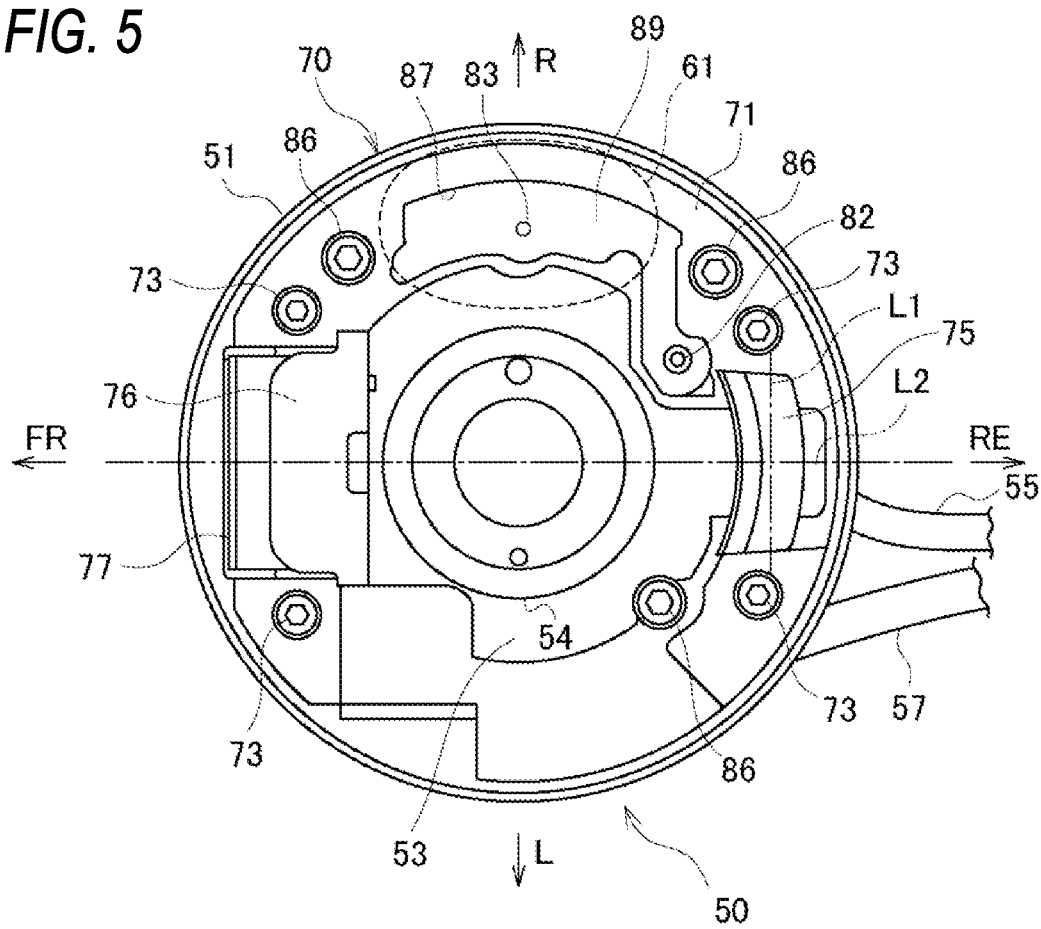
FIG. 5 is a plan view of a cap body and the tank inlet according to the present embodiment.

Hereinafter, the fuel tank will be described with reference to FIGS. 2 to 5. FIG. 2 is a perspective view of the fuel tank according to the present embodiment. FIG. 3A is a perspective view of the tank inlet of the present embodiment as viewed from above. FIG. 3B is a perspective view of the tank inlet of the present embodiment as viewed from below. FIG. 4A is a perspective view of the tank cap of the present embodiment as viewed from above. FIG. 4B is a perspective view of the tank cap of the present embodiment as viewed from below. FIG. 5 is a plan view of a cap body and the tank inlet according to the present embodiment. In FIG. 2, the tank cover is removed from the fuel tank. In FIG. 5, a separator cover is removed from an in-cap separator.

As shown in FIG. 2, a front portion of the fuel tank 40 is supported near the head pipe 11 via a bracket 41, and a rear portion of the fuel tank 40 is supported by the upper portions of the body frames 14 (see FIG. 1) via a bracket 42. The fuel tank 40 is supported above the pair of main frames 12, and the front portion of the fuel tank 40 is formed in a substantially U-shape in a front view so as to cover the pair of main frames 12 from the left and right sides. A tank panel 43 of the fuel tank 40 is formed by joining an outer edge of an outer panel 44 whose lower surface is open and an outer edge of an inner panel 45 whose upper surface is open. A storage space S (see FIG. 8) of a fuel is formed by joining the outer panel 44 and the inner panel 45.

A circular opening is formed in an upper portion of the outer panel 44, and the tank inlet 50 in which a fuel supply port is formed is fixed to the circular opening. The tank cap 70 for opening and closing the fuel supply port is attached to the tank inlet 50. In a state where the tank cap 70 is opened, a fueling nozzle is inserted into the fuel supply port of the tank inlet 50, so that the fuel is supplied from the fueling nozzle to the storage space S of the tank panel 43. Although the tank inlet 50 appears to be exposed around the tank cap 70 in FIG. 2, the tank cap 70 is actually covered with the tank cover 35 (see FIG. 1) on the outer panel 44.

As shown in FIGS. 3A and 3B, the tank inlet 50 includes a bottomed cylindrical inlet plate 51 to which the tank cap 70 (see FIGS. 4A and 4B) is to be attached. A peripheral wall 52 of the inlet plate 51 is formed in a circular shape, and the peripheral wall 52 is joined to an inner edge of the circular opening of the outer panel 44. An inlet pipe 54 serving as the fuel supply port is attached to a center of a bottom wall 53 of the inlet plate 51. An upper end of the inlet pipe 54 slightly protrudes from the bottom wall 53 of the inlet plate 51 toward the tank cap 70 side, and a lower end of the inlet pipe 54 greatly protrudes from the bottom wall 53 of the inlet plate 51 toward the storage space S.

A breather pipe 55 that guides a gas component in the inlet plate 51 to the outside of the fuel tank 40 is connected to the bottom wall 53 of the inlet plate 51 in the vicinity of the inlet pipe 54. A portion of the bottom wall 53 of the inlet plate 51 in the vicinity of the peripheral wall 52 is recessed, and a drain pipe 57 for discharging liquid droplets in the inlet plate 51 is connected to a bottom surface of a recess 56. Since an inlet of the drain pipe 57 is exposed to the bottom surface of the recess 56, droplets on the bottom wall 53 of the inlet plate 51 are easily collected to the drain pipe 57. Screw holes 59 of cap nuts 58 by which the tank cap 70 is fixed are exposed from the bottom wall 53 of the inlet plate 51.

A lower surface of the bottom wall 53 of the inlet plate 51 is exposed to the storage space S. The separator 61 is supported on the lower surface of the bottom wall 53 that separates the fuel entering from the storage space S into a liquid component and a gas component. The separator 61 is formed by joining a bottom plate 63 to a cylindrical case 62 having an upper base. A gas-liquid separation chamber 64 (see FIG. 8) for separating the fuel into gas and liquid is formed by joining the cylindrical case 62 and the bottom plate 63. An upper wall of the cylindrical case 62 is joined to the bottom wall 53 of the inlet plate 51, and a communication hole 65 is formed that passes through a joint portion of the upper wall of the cylindrical case 62 and the bottom wall 53 of the inlet plate 51.

A pair of return holes 66 for returning a liquid fuel in the gas-liquid separation chamber 64 to the storage space S are formed in a bottom wall (bottom plate 63) of the separator 61. A vent hole 67 through which the gas-liquid separation chamber 64 and the storage space S are communicated is formed in a side wall of the separator 61 (cylindrical case 62). The vent hole 67 is formed in the side wall of the separator 61 at a position close to the bottom wall 53 of the inlet plate 51. Although details will be described later, the gas-liquid separation chamber 64 of the separator 61 and the storage space S of the tank panel 43 are in communication with each other, so that a decrease in space capacity for allowing for volume expansion of the fuel at the time of temperature rise in the storage space S is suppressed.

As shown in FIGS. 4A and 4B, the tank cap 70 has an annular cap body 71 to which a circular cap plate 72 is attached so as to be opened and closed. An annular cap cover 74 that covers a periphery of the cap plate 72 is attached to a front surface of the cap body 71 via four bolts 73. A rear portion of the cap cover 74 is partially cut out to expose a hinge portion 75 of the cap body 71, and the cap plate 72 is pivotally supported by the hinge portion 75. A front portion of the cap cover 74 covers a lock portion 76 (see FIG. 5) of the cap body 71, and the cap plate 72 is locked in a closed state by the lock portion 76.

An actuator 77, for example, is attached to the cap body 71 as an electric component that locks and unlocks the cap plate 72. The actuator 77 is attached to the front portion of the cap body 71, and when a wireless signal from a smart key is received, the lock portion 76 is driven by the actuator 77 to switch between locking and unlocking of the cap plate 72. An in-cap separator 87 (see FIG. 5), which will be described later, is formed in a right portion of the cap body 71.

A knob 79 is formed on a front surface of the cap plate 72, and a cap seal 81 is screwed to a back surface of the cap plate 72. When the knob 79 on the front surface of the cap plate 72 is pulled up, the cap plate 72 is opened and closed with the hinge portion 75 serving as a fulcrum. When the cap plate 72 is closed, the upper end of the inlet pipe 54 (see FIG. 3A) is sealed by the cap seal 81. A discharge hole 82 facing an inlet of the breather pipe 55 and an inflow hole 83 facing the separator 61 are formed in the back surface of the cap body 71, and O-rings 84 and 85 are fitted around the discharge hole 82 and the inflow hole 83 respectively.

As shown in FIG. 5, the cap body 71 is positioned inside the inlet plate 51, and three bolts 86 penetrating the cap body 71 are fixed by the cap nuts 58 (see FIG. 3B) of the inlet plate 51. The in-cap separator 87 is formed in the right portion of the cap body 71 and has a gas-liquid separation chamber 89 for separating the fuel entering from the storage space S into a liquid component and a gas component.

The inflow hole 83 is formed in the in-cap separator 87, and the inflow hole 83 is in communication with the communication hole 65 (see FIG. 3A) of the inlet plate 51 and the separator 61. The gas-liquid separation chamber 89 of the in-cap separator 87 is in communication with the gas-liquid separation chamber 64 (see FIG. 8) of the separator 61 through the inflow hole 83 and the communication hole 65. With the in-cap separator 87 and the separator 61 of the tank inlet 50, capacity of all the gas-liquid separation chambers of the entire tank cap 70 is sufficiently secured. The separator 61 is disposed on a back side of the in-cap separator 87 with the bottom wall 53 of the inlet plate 51 sandwiched between the separator 61 and the in-cap separator 87, and the in-cap separator 87 and the separator 61 are compactly disposed.

The discharge hole 82 is formed in the vicinity of the hinge portion 75 of the in-cap separator 87, and the discharge hole 82 is in communication with the inlet (see FIG. 3A) of the breather pipe 55. A gas component of the fuel in the gas-liquid separation chamber 89 enters the breather pipe 55 from the discharge hole 82, and the gas component is discharged to the outside of the fuel tank 40 through the breather pipe 55. Since the breather pipe 55 is connected not to the separator 61 in the storage space S but to the in-cap separator 87 located above the tank, a degree of freedom in shape of the separator 61 is increased, and the capacity of all the gas-liquid separation chambers can be secured.

The tank cap 70 is positioned at a center of the fuel tank 40 (see FIG. 2) in a vehicle width direction, and a plate center line L2 perpendicular to an opening and closing axis L1 of the cap plate 72 (see FIG. 4A) coincides with a vehicle body center line extending in a vehicle front-rear direction.

Figure 6A:
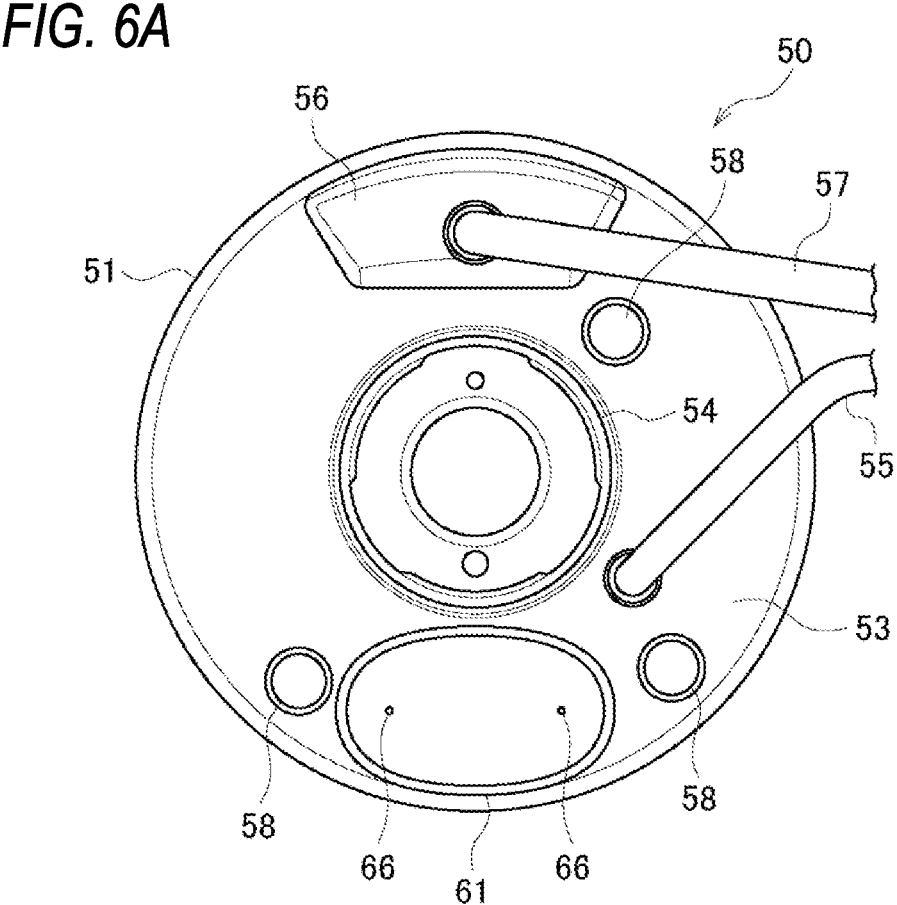
FIG. 6A is a view showing an arrangement position of a separator according to the present embodiment.
Figure 6B:
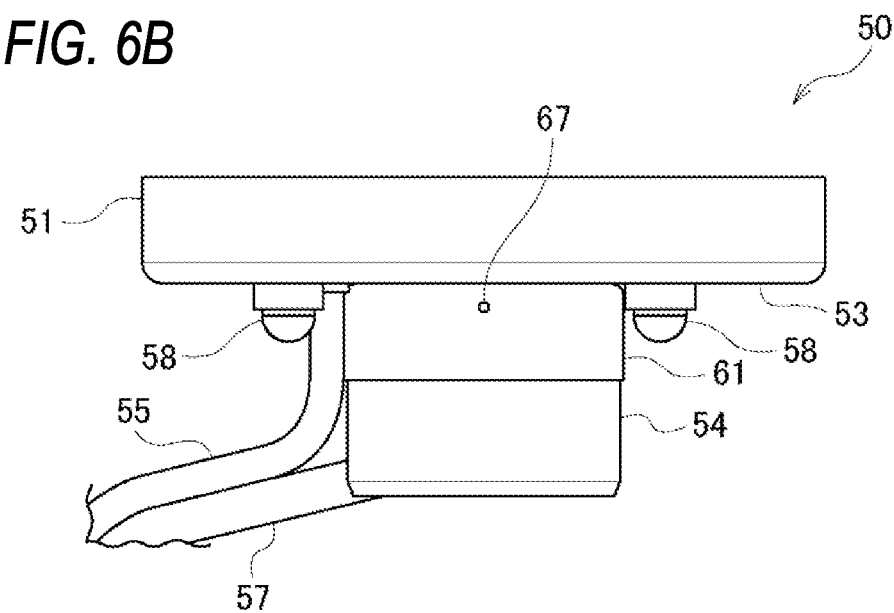
FIG. 6B is another view showing the arrangement position of the separator according to the present embodiment.

The arrangement position of the separator will be described with reference to FIGS. 6A and 6B. FIG. 6A is a bottom view of the tank inlet, showing the arrangement position of the separator according to the present embodiment. FIG. 6B is a side view of the tank inlet, showing the arrangement position of the separator according to the present embodiment.

As shown in FIGS. 6A and 6B, the separator 61 is disposed on an outer side of the inlet pipe 54 and on an inner side relative to an outer edge of the inlet plate 51 in a bottom view of the inlet plate 51. The separator 61 is formed in an elliptical shape in the bottom view. A length of a minor axis of the separator 61 is smaller than a width from an inner edge to the outer edge of the inlet plate 51, and a diameter of the inlet pipe 54 is substantially equal to a length of a major axis of the separator 61. Therefore, the separator 61 falls inside a projection plane of the inlet plate 51 in the bottom view, and the separator 61 substantially overlaps a projection plane of the inlet pipe 54 in the side view.

Since the separator 61 does not protrude from the inlet plate 51 in the bottom view and the separator 61 hardly protrudes from the inlet pipe 54 in the side view, a significant change in a shape, a size, and the like of the tank inlet 50 due to presence or absence of the separator 61 does not occur. A basic structure of the fuel tank 40 can be made common between the tank cap 70 of the smart key specification as in the present embodiment and a tank cap of the mechanical key specification without the separator 61. Therefore, the manufacturing cost is reduced by using the same mold jig or manufacturing equipment for forming the tank panel 43 in the smart key specification and the mechanical key specification.

In addition, since the separator 61 is supported by the inlet plate 51 and the separator 61 is provided outside the tank cap 70, the cap size of the tank cap 70 does not increase. The breather pipe 55 is connected to the bottom wall 53 of the inlet plate 51 behind the separator 61, and the drain pipe 57 is connected to the bottom wall 53 of the inlet plate 51 at a position symmetrical with (opposite to) the separator 61 with respect to the inlet pipe 54. Since the drain pipe 57 is sufficiently separated from the separator 61, the bottom wall 53 of the inlet plate 51 can be expanded toward the storage space S to form the recess 56 at a connection portion of the drain pipe 57.

Figure 7:
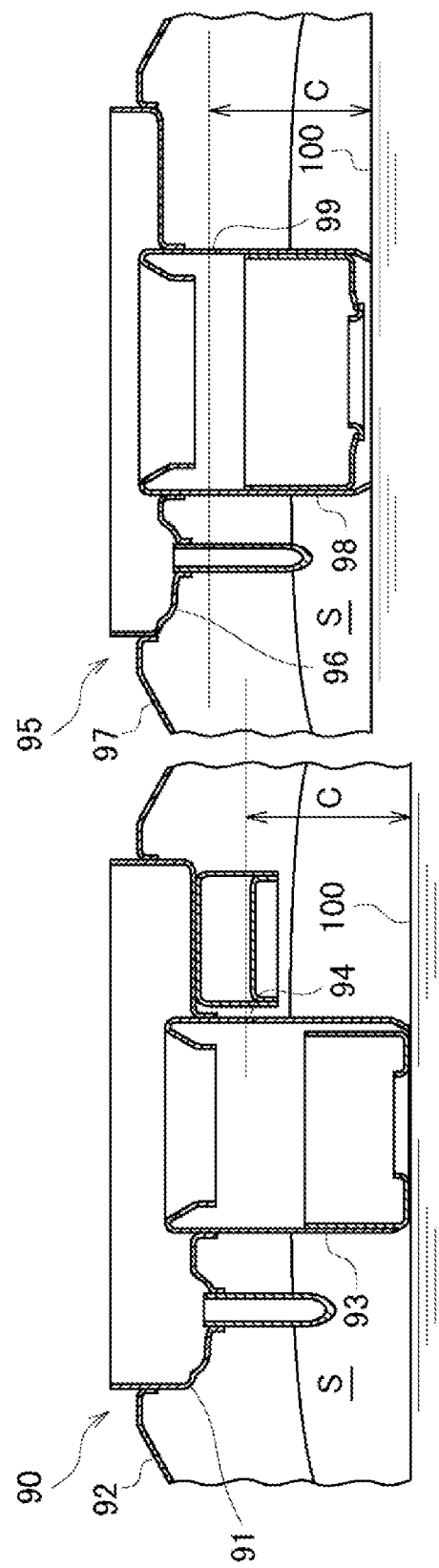
FIG. 7 is a diagram showing a difference in space capacity between fuel tanks of a comparative example and a mechanical key specification.
Figure 8:
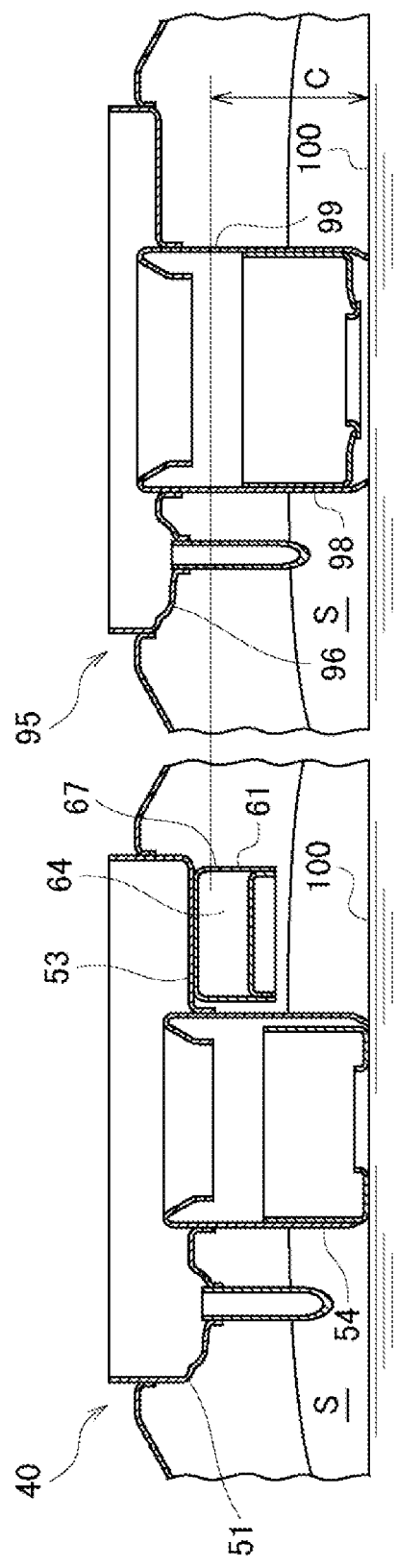
FIG. 8 is a diagram showing a difference in space capacity between fuel tanks of the present embodiment and the mechanical key specification.
Figure 9:
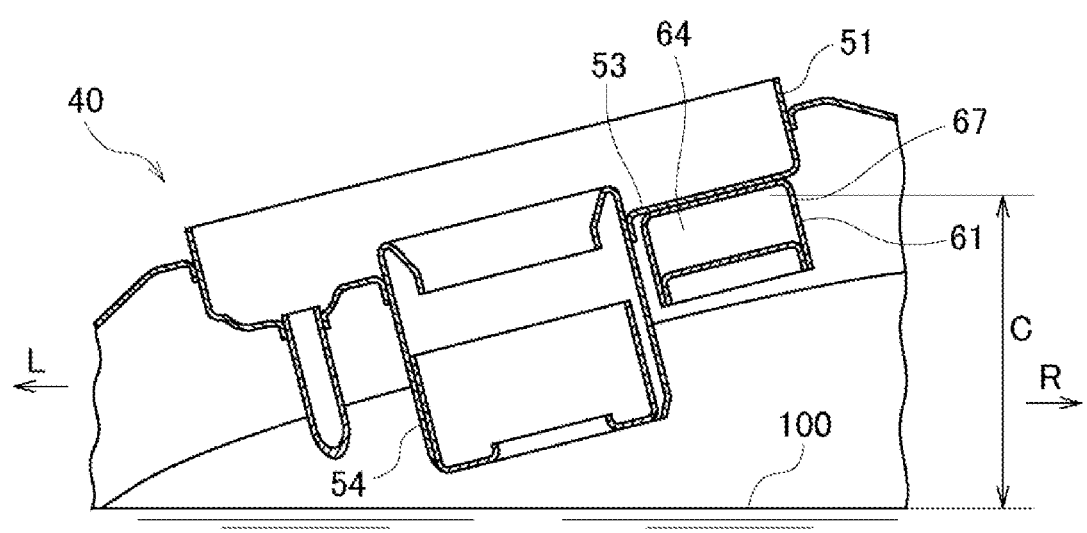
FIG. 9 is a diagram showing an example of the fuel tank in a parked state according to the present embodiment.

The space capacity of the fuel tank will be described with reference to FIGS. 7 to 9. FIG. 7 is a diagram showing a difference in space capacity between fuel tanks of a comparative example and a mechanical key specification. FIG. 8 is a diagram showing a difference in space capacity between fuel tanks of the present embodiment and the mechanical key specification. FIG. 9 is a diagram showing an example of the fuel tank in a parked state according to the present embodiment. In FIGS. 7 and 8, the left side shows a fuel tank of the smart key specification, and the right side shows the fuel tank of the mechanical key specification. The fuel tank of the comparative example in FIG. 7 is the same as the fuel tank of the present embodiment except for a location where the vent hole is formed.

As shown in FIG. 7, inlet plates 91 and 96 of fuel tanks 90 and 95 of the smart key specification (comparative example) and the mechanical key specification enter the storage space S from tank panels 92 and 97 respectively. The inlet plates 91 and 96 are joined to inlet pipes 93 and 98 by brazing or the like, and vent holes 94 and 99 are formed in peripheral walls of the inlet pipes 93 and 98 below joining ranges. The number of components of the tank cap of the smart key specification is greater than that of tank cap of the mechanical key specification. Therefore, a bottom surface of the inlet plate 91 of the smart key specification is lower than a bottom surface of the inlet plate 96 of the mechanical key specification, and a formation position of the vent hole 94 is lower than that of the vent hole 99.

With respect to both of the storage spaces S of the fuel tanks 90 and 95 of the smart key specification and the mechanical key specification, a space capacity C for allowing for volume expansion of the fuel due to temperature rise is required. The space capacity C is a volume measuring from a liquid surface 100 to the vent holes 94 and 99 at the time when the fuel tank is full of fuel. Since the vent hole 94 of the fuel tank 90 is lower than the vent hole 99 of the fuel tank 95, an upper limit height of the space capacity C of the fuel tank 90 is lower than that of the fuel tank 95. Therefore, in order for the fuel tank 90 to obtain the space capacity C similar to that of the fuel tank 95, the liquid surface 100 at the time when the fuel tank 90 is full of fuel needs to be lower than that of the fuel tank 95, and capacity for storing fuel in the fuel tank 90 decreases.

As shown in FIG. 8, in the fuel tank 40 of the present embodiment, the vent hole 67 is formed in the separator 61. Since the separator 61 does not need to have a strength against insertion and removal of a fueling nozzle such as the inlet pipe 54, the separator 61 can be fixed to the inlet plate 51 without being subjected to brazing or the like. Therefore, in the separator 61, the vent hole 67 can be formed at a position close to the bottom wall 53 of the inlet plate 51. Therefore, by aligning heights of the vent holes 67 and 99 of the fuel tanks 40 and 95 of the smart key specification and the mechanical key specification, the space capacity C similar to that of the fuel tank 95 can be obtained without reducing the capacity for storing fuel of the fuel tank 40.

As shown in FIG. 9, when the straddle-type vehicle 1 (see FIG. 1) is parked, the fuel tank 40 is inclined to one of the right and left sides (the left side in the present embodiment), and a space on the right side of the fuel tank 40 is larger than a space on the left side. The separator 61 is disposed on a side (the right side in the present embodiment) opposite to the side stand 19 (see FIG. 1) with the inlet pipe 54 located therebetween. Further, the vent hole 67 of the separator 61 opens toward an outer side in a radial direction of the inlet pipe 54, and the vent hole 67 is far away from the side stand 19. Since the vent hole 67 is separated upward from the liquid surface 100 of the fuel due to the inclination of the vehicle body, the space capacity C is secured, and the capacity for storing fuel can be increased.

As described above, according to the present embodiment, since the separator 61 is supported by the bottom wall 53 of the inlet plate 51 and the separator 61 is provided outside the tank cap 70, the cap size of the tank cap 70 is not increased. In addition, the separator 61 is positioned on the inner side of the projection plane of the inlet plate 51 in a bottom view, and the separator 61 does not protrude from the inlet plate 51. Accordingly, since a change in the basic structure of the fuel tank 40 due to presence or absence of the separator 61 does not occur, the manufacturing cost can be reduced by diverting existing manufacturing equipment or the like.

The fuel tank of the present embodiment can also be appropriately applied to other straddle-type vehicles such as a buggy-type automatic three-wheeled vehicle. Here, the straddle-type vehicle is not limited to a general vehicle on which a rider drives the vehicle in a posture of straddling a seat, and further includes a scooter-type vehicle on which a rider drives the vehicle without straddling a seat.

In addition, although an example in which the separator is added to the tank inlet of the fuel tank of the smart key specification has been described in the present embodiment, the separator may be added to a tank inlet of a fuel tank of a mechanical key specification. For example, even when a new component needs to be mounted on a tank cap of a mechanical key specification, an increase in the cap size due to addition of the separator to the tank inlet can be suppressed.

In addition, although the in-cap separator is provided in the tank cap and the separator is provided at the tank inlet in the present embodiment, the separator may be provided at least at the tank inlet.

In addition, although the vent hole is formed in the separator in the present embodiment, the vent hole may be formed in the inlet pipe.

In addition, although the separator is provided on the side opposite to the side stand with the inlet pipe located therebetween in the present embodiment, a positional relationship between the separator and the side stand is not particularly limited.

In addition, although the separator is formed by joining the bottom plate to the cylindrical case having an upper base in the present embodiment, the shape and structure of the separator are not particularly limited. The upper wall of the cylindrical case may be open, and the side wall of the cylindrical case may be fixed to the bottom wall of the inlet plate. The cylindrical case and the bottom plate may be integrally formed.

In addition, although the breather pipe and the drain pipe pass through the inside of the tank panel in the present embodiment, the breather pipe and the drain pipe may pass through the outside of the tank panel.

As described above, the fuel tank (40) of the present embodiment includes the tank panel (43) in which the storage space (S) of a fuel is formed, the tank inlet (50) that is fixed to the tank panel, and the tank cap (70) that allows the tank inlet to be opened and closed. The tank inlet includes the bottomed cylindrical inlet plate (51) to which the tank cap is attached, the inlet pipe (54) that protrudes from the bottom wall (53) of the inlet plate into the storage space, and the separator (61) that separates the fuel entering from the storage space into a liquid component and a gas component. The separator is supported by the bottom wall of the inlet plate in the storage space, and the separator is disposed on the outer side of the inlet pipe and on the inner side relative to the outer edge of the inlet plate in the bottom view of the tank inlet. According to this configuration, since the separator is supported by the bottom wall of the inlet plate in the storage space of the tank panel and the separator is provided outside the tank cap, the cap size of the tank cap is not increased. In addition, the separator is positioned on the inner side of the projection plane of the inlet plate in a bottom view, and the separator does not protrude from the inlet plate. Accordingly, since a change in the basic structure of the fuel tank due to presence or absence of the separator does not occur, the manufacturing cost can be reduced by diverting existing manufacturing equipment or the like.

In the fuel tank of the present embodiment, the separator is formed with the vent hole (67) through which the gas-liquid separation chamber (64) of the separator and the storage space are communicated with each other. According to this configuration, since the vent hole is formed in the separator on which an external force is less likely to act, the vent hole can be brought close to the bottom wall of the inlet plate. Since the upper limit height of the space capacity is increased, the capacity for storing fuel can be increased.

In the fuel tank of the present embodiment, the separator is disposed on the side opposite to the side stand (19), which allows the vehicle body to self-stand in an inclined manner, with the inlet pipe located therebetween. According to this configuration, since the vent hole of the separator is separated upward from the liquid surface of the fuel by the inclination of the vehicle body, the space capacity is secured, and the capacity for storing fuel can be increased.

In the fuel tank of the present embodiment, the vent hole opens toward an outer side in the radial direction of the inlet pipe. According to this configuration, the vent hole of the separator can be further separated upward from the liquid surface of the fuel by the inclination of the vehicle body.

In the fuel tank of the present embodiment, the tank cap includes the in-cap separator (87) that separates the fuel entering from the storage space into a liquid component and a gas component, and the gas-liquid separation chamber (89) of the in-cap separator is in communication with the gas-liquid separation chamber of the separator through the communication hole (65) formed in the bottom wall of the inlet plate. According to this configuration, the capacity of the gas-liquid separation chamber can be sufficiently secured with the separator and the in-cap separator, and the separator and the in-cap separator can be disposed compactly.

In the fuel tank of the present embodiment, the breather pipe (55) for discharging the gas component of the fuel is in communication with the in-cap separator. According to this configuration, a location where the vent hole is formed with respect to the separator in the storage space is not restricted by the breather pipe.

Although the present embodiment has been described, the above-described embodiment and a modification may be combined in whole or in part as another embodiment.

The technique of the present invention is not limited to the above-described embodiment, and various changes, substitutions, and modifications may be made without departing from the spirit of the technical idea of the present invention. Further, the present invention may be implemented using other methods as long as the technical idea can be implemented by the methods through advance of the technology or other derivative technology. Accordingly, the claims cover all embodiments that may be included within the scope of the technical idea.

What is claimed is:

1. A fuel tank comprising:
a tank panel in which a storage space of a fuel is formed;
a tank inlet fixed to the tank panel; and
a tank cap that allows the tank inlet to be opened and closed, wherein
the tank inlet includes
  an inlet plate which has a bottomed cylindrical shape and to which the tank cap is attached,
  an inlet pipe that protrudes from a bottom wall of the inlet plate into the storage space, and
  a separator configured to separate the fuel entering from the storage space into a liquid component and a gas component,
the separator is supported by the bottom wall of the inlet plate in the storage space and comprises a gas-liquid separation chamber, and
the separator is disposed on an outer side of the inlet pipe and on an inner side relative to an outer edge of the inlet plate in a bottom view of the tank inlet,
the tank cap includes an in-cap separator configured to separate the fuel entering from the storage space into the liquid component and the gas component, and
a gas-liquid separation chamber of the in-cap separator is in communication with the gas-liquid separation chamber of the separator through a communication hole formed in the bottom wall of the inlet plate,
a breather pipe, configured to discharge the gas component of the fuel is in communication with the in-cap separator, and
the breather pipe is connected to the bottom wall of the inlet plate at a position separated from the separator.

2. The fuel tank according to claim 1, wherein
the separator is formed with a vent hole through which a gas-liquid separation chamber of the separator and the storage space are in communication with each other.

3. The fuel tank according to claim 2, wherein
the separator is disposed on a side opposite to a side stand, which allows a vehicle body to self-stand in an inclined manner, with respect to the inlet pipe located therebetween.

4. The fuel tank according to claim 3, wherein
the vent hole opens toward an outer side in a radial direction of the inlet pipe.

5. The fuel tank according to claim 1, wherein
the breather pipe is connected to the bottom wall of the inlet plate behind the separator.

6. The fuel tank according to claim 1, wherein
the separator is formed in an elliptical shape, in the bottom view,
a length of a minor axis of the separator is smaller than a width from an inner edge of the inlet plate to the outer edge of the inlet plate, a diameter of the inlet pipe is equal to a length of a major axis of the separator, the separator is located inside a projection plane of the inlet plate, in the bottom view, and the separator overlaps a projection plane of the inlet pipe, in a side view.

7. The fuel tank according to claim 6, wherein a lower edge of the separator is located on an upper side of a lower edge of the inlet pipe, in the side view.

* * * * *